US010699636B2

(12) United States Patent
You et al.

(10) Patent No.: US 10,699,636 B2
(45) Date of Patent: Jun. 30, 2020

(54) DISPLAY DEVICE

(71) Applicant: Samsung Display Co., Ltd., Yongin-si, Gyeonggi-do (KR)

(72) Inventors: Jin Young You, Cheonan-si (KR); Tae Wook Kim, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 63 days.

(21) Appl. No.: 16/169,825

(22) Filed: Oct. 24, 2018

(65) Prior Publication Data

US 2019/0259328 A1 Aug. 22, 2019

(30) Foreign Application Priority Data

Feb. 19, 2018 (KR) .................. 10-2018-0019324

(51) Int. Cl.
*G09G 3/3233* (2016.01)
*G09G 3/20* (2006.01)
*G09G 3/36* (2006.01)
*H01R 12/79* (2011.01)
*G02F 1/1362* (2006.01)
*G09G 3/3258* (2016.01)

(52) U.S. Cl.
CPC ..... *G09G 3/3233* (2013.01); *G02F 1/136286* (2013.01); *G09G 3/2092* (2013.01); *G09G 3/3258* (2013.01); *G09G 3/3648* (2013.01); *G09G 3/3677* (2013.01); *G09G 3/3696* (2013.01); *G09G 2330/021* (2013.01); *G09G 2330/028* (2013.01)

(58) Field of Classification Search
CPC ............................................. G09G 2320/0233
See application file for complete search history.

(56) References Cited

U.S. PATENT DOCUMENTS

| | | | | |
|---|---|---|---|---|
| 10,140,948 B2* | 11/2018 | Xie | ........................ | G09G 5/003 |
| 10,304,398 B2* | 5/2019 | Zheng | .................. | G02F 1/13306 |
| 2006/0044237 A1* | 3/2006 | Lee | ........................ | G09G 3/3233 345/82 |
| 2006/0145961 A1* | 7/2006 | Hu | ........................ | G09G 3/3225 345/76 |
| 2007/0132674 A1* | 6/2007 | Tsuge | .................... | G09G 3/2074 345/77 |
| 2008/0137016 A1* | 6/2008 | Kim | ..................... | G02F 1/13452 349/139 |

(Continued)

FOREIGN PATENT DOCUMENTS

KR   10-2008-0088076 A   10/2008
KR   10-2008-0090879 A   10/2008

(Continued)

*Primary Examiner* — Sepehr Azari
(74) *Attorney, Agent, or Firm* — Lewis Roca Rothgerber Christie LLP

(57) ABSTRACT

A display device includes: a display panel including a plurality of pixels; a circuit board including: a power supply configured to output a reference voltage; and a signal controller; a connecting member electrically connecting the display panel and the circuit board; and a voltage modulator configured to generate a second power supply voltage of a low level with a division voltage using the reference voltage according to a switch control signal from the signal controller and to supply the second power supply voltage to the plurality of pixels.

19 Claims, 9 Drawing Sheets

(56) References Cited

U.S. PATENT DOCUMENTS

| | | | |
|---|---|---|---|
| 2009/0184626 A1* | 7/2009 | Kim | G09G 3/3208 313/504 |
| 2009/0207106 A1* | 8/2009 | Mizukoshi | G09G 3/3233 345/76 |
| 2010/0026674 A1* | 2/2010 | Araki | G09G 3/3233 345/211 |
| 2011/0169990 A1* | 7/2011 | Higuchi | H03K 4/48 348/302 |
| 2012/0081410 A1* | 4/2012 | Yeo | G09G 3/2092 345/690 |
| 2013/0154506 A1* | 6/2013 | Ebisuno | H05B 33/08 315/294 |
| 2014/0240305 A1* | 8/2014 | Chae | G09G 3/3225 345/212 |
| 2014/0339508 A1* | 11/2014 | Hong | H01L 27/3258 257/40 |
| 2015/0015553 A1* | 1/2015 | Cho | G09G 3/3611 345/208 |
| 2016/0049113 A1* | 2/2016 | Park | G09G 3/3225 345/212 |
| 2016/0071464 A1* | 3/2016 | Park | G09G 3/3291 345/212 |
| 2016/0189628 A1* | 6/2016 | Choi | G09G 3/3233 345/690 |
| 2017/0011702 A1* | 1/2017 | Yamagishi | G09G 3/3696 |
| 2017/0025061 A1* | 1/2017 | Takizawa | G09G 3/3233 |
| 2017/0186354 A1 | 6/2017 | Zhang et al. | |
| 2019/0259328 A1* | 8/2019 | You | G09G 3/3258 |

FOREIGN PATENT DOCUMENTS

| | | |
|---|---|---|
| KR | 10-2014-0041968 A | 4/2014 |
| KR | 10-2014-0104739 A | 8/2014 |
| KR | 10-2017-0033966 A | 3/2017 |

* cited by examiner

DISPLAY DEVICE

CROSS-REFERENCE TO RELATED APPLICATION

The present application claims priority to and the benefit of Korean Patent Application No. 10-2018-0019324 filed in the Korean Intellectual Property Office on Feb. 19, 2018, the entire content of which is incorporated herein by reference.

BACKGROUND

1. Field

Aspects of some example embodiments of the present invention relate to a display device, for example, a display device that may control a power supply voltage.

2. Description of the Related Art

A display device may include a display panel in which a plurality of pixels for displaying an image are arranged, and a circuit board in which a power supply for supplying a power supply voltage to the display panel is provided. The display panel and the circuit board may be connected to each other by a plurality of flexible circuit boards, and the power source voltage may be provided to the display panel through a plurality of flexible circuit boards.

Resistances of connection portions between the respective plurality of flexible circuit boards and the display panel may be differentiated from each other in a manufacturing process. In addition, resistances of connection portions between the respective plurality of flexible circuit boards and the circuit board may be differentiated in a manufacturing process. A level of the power supply voltage provided to the display panel through the plurality of flexible circuit boards may vary in respective areas of the display panel depending on resistance differences between the connection portions, thus a power supply voltage of a different level from that of a desired level may be provided to the display panel. Therefore, luminance may not be constant for respective areas of the display panel, or an image of a luminance that is different from a desired luminance may be displayed.

The above information disclosed in this Background section is only for enhancement of understanding of the background of the invention and therefore it may contain information that does not form the prior art that is already known in this country to a person of ordinary skill in the art.

SUMMARY

Aspects of some example embodiments of the present invention have been described in an effort to illustrate example embodiments in which a display device may uniformly provide a power source voltage to a display panel in consideration of a resistance of a connection portion between each of a plurality of flexible circuit boards and the display panel, and of a resistance of a connection portion between each of the plurality of flexible circuit boards and a circuit board.

According to some example embodiments of the present invention, a display device includes: a display panel configured to include a plurality of pixels; a circuit board configured to include a power supply outputting a reference voltage, and a signal controller; a connecting member configured to electrically connect the display panel and the circuit board; and a voltage modulator configured to generate a second power supply voltage of a low level with a division voltage using the reference voltage according to a switch control signal of the signal controller and to supply the second power supply voltage to the plurality of pixels.

The display device may further include a plurality of data driving circuit portions configured to apply a data voltage to the plurality of pixels, wherein the connecting member may include a first connecting member and a second connecting member corresponding to different data driving circuit portions, and the voltage modulator may include a first voltage modulator corresponding to the first connecting member and a second voltage modulator corresponding to the second connecting member.

The first voltage modulator and the second voltage modulator may be on the display panel, the reference voltage may be changed to a first reference voltage by a voltage drop due to the first connecting member to be inputted to the first voltage modulator, and the reference voltage may be changed to a second reference voltage by a voltage drop due to the second connecting member to be inputted to the second voltage modulator.

Output voltages of the first voltage modulator and the second voltage modulator may become equal to the second power supply voltage based on either one of the first reference voltage and the second reference voltage having a larger voltage drop.

The first voltage modulator may include: an input terminal to which the first reference voltage is inputted; a plurality of resistors connected in series between the input terminal and a ground; a plurality of transistors connected to a plurality of nodes between the input terminal and the ground; and an output terminal connected to the plurality of transistors, and the plurality of transistors may be selectively turned on by the switch control signal to transmit the second power supply voltage to the output terminal.

The second voltage modulator may include: an input terminal to which the second reference voltage is inputted; a plurality of resistors connected in series between the input terminal and a ground; a plurality of transistors connected to a plurality of nodes between the input terminal and the ground; and an output terminal connected to the plurality of transistors, and the plurality of transistors may be selectively turned on by the switch control signal to transmit the second power supply voltage to the output terminal.

The display device may further include a feedback line configured to feed back the first reference voltage and the second reference voltage to the signal controller.

The first voltage modulator and the second voltage modulator may be on the circuit board, the first voltage modulator may receive the reference voltage to output a first adjustment power supply voltage, and the first adjustment power supply voltage may be changed to the second power supply voltage by the voltage drop due to the first connecting member and then supplied to the plurality of pixels, while the second voltage modulator may receive the reference voltage to output a second adjustment power supply voltage, and the second adjustment power supply voltage may be changed to the second power supply voltage by the voltage drop due to the second connecting member and then supplied to the plurality of pixels.

The first voltage modulator may include: an input terminal to which the reference voltage is inputted; a plurality of resistors connected in series between the input terminal and a ground; a plurality of transistors connected to a plurality of nodes between the input terminal and the ground; and an output terminal connected to the plurality of transistors, and the plurality of transistors may be selectively turned on by the switch control signal to transmit the first adjustment power supply voltage to the output terminal.

The second voltage modulator may include: an input terminal to which the reference voltage is inputted; a plurality of resistors connected in series between the input terminal and a ground; a plurality of transistors connected to a plurality of nodes between the input terminal and the ground; and an output terminal connected to the plurality of transistors, and the plurality of transistors may be selectively turned on by the switch control signal to transmit the second adjustment power supply voltage to the output terminal.

The circuit board may include a memory that stores information of the voltage drop due to the first connecting member and the voltage drop due to the second connecting member, and the signal controller may generate the switch control signal by using the information stored in the memory.

The reference voltage may be a negative voltage.

Another embodiment of the present invention provides a display device including: a display panel configured to include a display area provided with a plurality of pixels; a power supply electrode configured to overlap all of the display area; a circuit board configured to include a power supply and a signal controller; a plurality of connecting members configured to electrically connect the display panel and the circuit board; and a plurality of power supply lines configured to connect the power supply and the power supply electrode through the plurality of connecting members, wherein the power supply may output adjustment power supply voltages of different levels to the plurality of power supply lines according to an output control signal of the signal controller.

The adjustment power supply voltages of the different levels may be changed to second power supply voltages of a low level by voltage drops due to the plurality of connecting members, and then may be transmitted to the power supply electrode.

The circuit board may include a memory that stores information of the voltage drop due to the plurality of connecting members, and the signal controller may generate the output control signal based on the information stored in the memory.

The display device may further include a plurality of feedback lines configured to feed back the second power supply voltage to the signal controller through the plurality of connecting members.

The adjustment power supply voltages of the different levels may be negative voltages.

Yet another embodiment of the present invention provides a display device including: a plurality of pixels; a power supply configured to supply a first power supply voltage to the plurality of pixels and to output a reference voltage; and a voltage modulator configured to generate a second power supply voltage with a division voltage using the reference voltage and to supply the second power supply voltage to the plurality of pixels, wherein each of the plurality of pixels may include a light-emitting diode, and a pixel circuit configured to control a current flowing from the first power supply voltage to the light-emitting diode, and a cathode of the light-emitting diode may be connected to the second power supply voltage.

The voltage modulator may include: an input terminal to which the reference voltage is inputted; a plurality of resistors connected in series between the input terminal and a ground; a plurality of transistors connected to a plurality of nodes between the input terminal and the ground; and an output terminal connected to the plurality of transistors, and the plurality of transistors may be selectively turned on to transmit the second power supply voltage to the output terminal.

The display device may further include: a display panel on which the plurality of pixels are positioned; a circuit board on which the power supply is positioned; a connecting member configured to electrically connect the display panel and the circuit board; a memory configured to store information of a voltage drop due to the connecting member; and a signal controller configured to generate a switch control signal that selectively turns on the plurality of transistors based on the information stored in the memory.

According to the embodiment of the present invention, it may be possible to uniformly provide a power source voltage to a display panel by adjusting the power source power in consideration of a resistance of a connection portion between each of a plurality of flexible circuit boards and the display panel and of a resistance of a connection portion between each of the plurality of flexible circuit boards and a circuit board, and it may be possible to prevent (or reduce) instances of luminance of the display panel not being constant for respective areas of the display panel, or to prevent (or reduce) instances of an image of a luminance that is different from a desired luminance being displayed.

DETAILED DESCRIPTION

Figure 1:
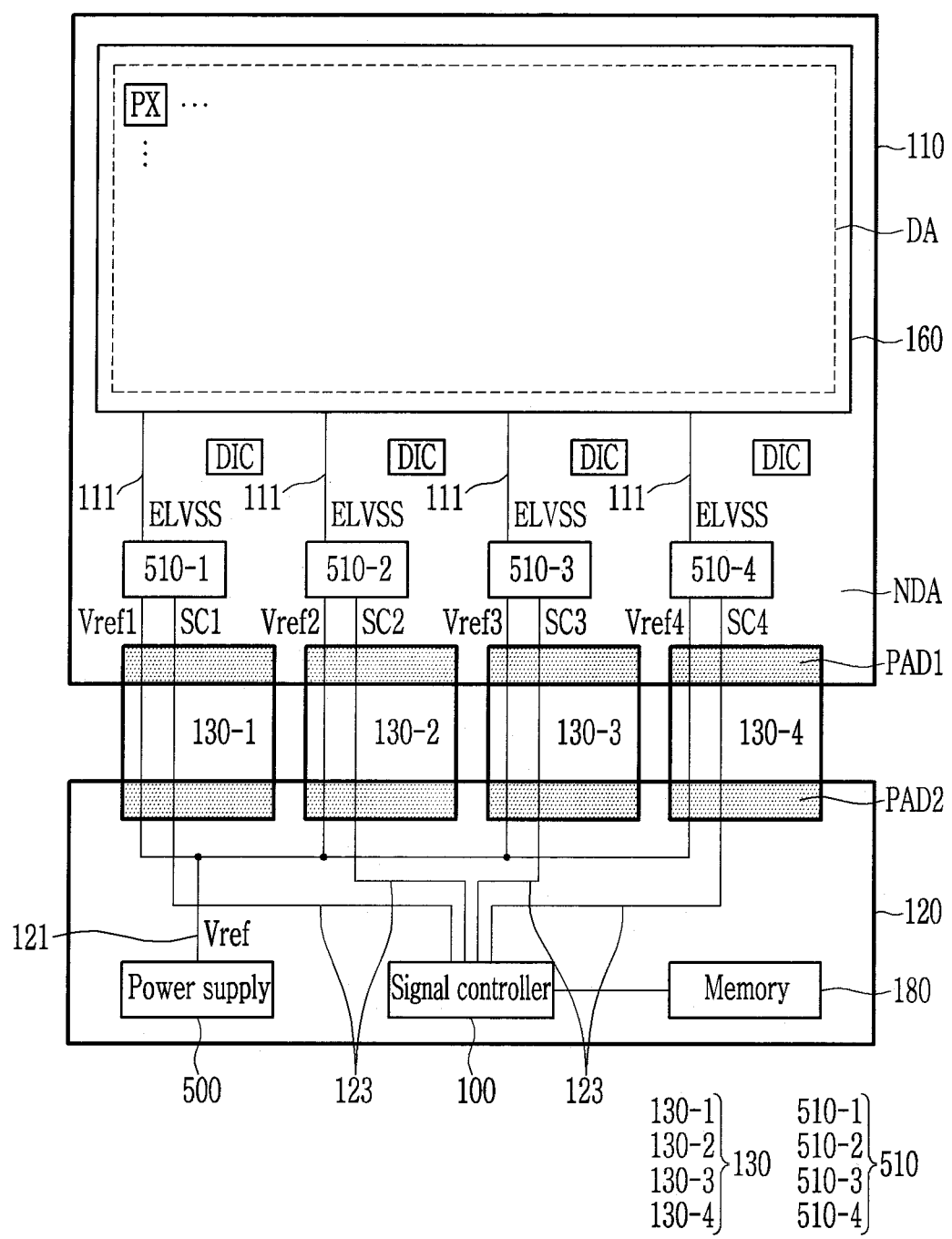
FIG. 1 illustrates a display device according to some example embodiments of the present invention.

Aspects of some example embodiments of the present disclosure will be described more fully hereinafter with reference to the accompanying drawings, in which example embodiments of the invention are shown. As those skilled in the art would realize, the described embodiments may be modified in various different ways, all without departing from the spirit or scope of the present disclosure.

Parts that are superfluous to the description may be omitted to more clearly describe aspects of the present disclosure, and like reference numerals designate like elements throughout the specification.

Further, in the drawings, the size and thickness of each element are arbitrarily illustrated for ease of description, and the present disclosure is not necessarily limited to those illustrated in the drawings.

In addition, unless explicitly described to the contrary, the word "comprise" and variations such as "comprises" or "comprising" will be understood to imply the inclusion of stated elements but not the exclusion of any other elements.

Hereinafter, a display device according to some example embodiments of the present invention will be described with reference to FIG. 1 and FIG. 2.

FIG. 1 illustrates a display device according to some example embodiments of the present invention.

Referring to FIG. 1, the display device includes a display panel 110, a circuit board 120, and a connecting member 130 for electrically connecting the display panel 110 and the circuit board 120.

The display panel 110 includes a display area DA including a plurality of pixels PX and a non-display area NDA surrounding the display area DA (e.g., outside a footprint of the display area DA).

The display area DA may include a plurality of gate lines extending in a first direction (e.g., in a row direction) and a plurality of data lines extending in a second direction (e.g., in a column direction). The plurality of gate lines and the plurality of data lines may be connected to the plurality of pixels PX, a gate signal may be applied to the plurality of pixels through the plurality of gate lines, and a data voltage may be applied to the plurality of pixels PX through the plurality of data lines.

In addition, a power supply electrode 160 may be arranged in the display area DA. The power supply electrode 160 is an electrode providing a power supply voltage for driving the plurality of pixels PX. The power supply electrode 160 may be an electrode overlapping all of the display area DA. The power supply voltage for driving the plurality of pixels PX may include a high level first power supply voltage ELVDD (see FIG. 8) and a low level second power supply voltage ELVSS. A power supply voltage applied to the power supply electrode 160 may be the low level second power supply voltage ELVSS.

At least one data driving circuit portion DIC for applying a data voltage to the plurality of pixels PX through the plurality of data lines may be arranged in the non-display area NDA. Hereinafter, a display device including four data driving circuit portions DIC according to some example embodiments will be described. The four data driving circuit portions DIC may be arranged along one side of the display area DA. The data driving circuit portion DIC may be mounted on the display panel 110 in a form of a chip on glass (COG). In some example embodiments, the data driving circuit portion DIC may be arranged at the connecting member 130 without being positioned at the display panel 110, and in this case, the data driving circuit portion DIC may be mounted on the connecting member 130 in a form of a chip on film (COF).

In addition, a voltage modulator 510 outputting the second power supply voltage ELVSS may be arranged in the non-display area NDA. The voltage modulator 510 is connected to the power supply electrode 160 through a power supply line 111. A number of the voltage modulators 510 may correspond to that of the connecting members 130. The number of the connecting members 130 may correspond to that of the data driving circuit portions DIC.

Hereinafter, a display device including first to fourth connecting members 130-1, 130-2, 130-3, and 130-4 and first to fourth voltage modulators 510-1, 510-2, 510-3, and 510-4 according to some example embodiments will be described. The first voltage modulator 510-1 may correspond to the first connecting member 130-1, the second voltage modulator 510-2 may correspond to the second connecting member 130-2, the third voltage modulator 510-3 may correspond to the third connecting member 130-3, and the fourth voltage modulator 510-4 may correspond to the fourth connecting member 130-4. The first to fourth connecting members 130-1, 130-2, 130-3, and 130-4 may correspond to different data driving circuit portions DIC.

The first to fourth voltage modulators 510-1, 510-2, 510-3, and 510-4 are arranged along one side of the display area DA, and the first to fourth voltage modulators 510-1, 510-2, 510-3, and 510-4 are respectively connected to the power supply electrode 160 through different power supply lines 111. The first to fourth voltage modulators 510-1, 510-2, 510-3, and 510-4 may be connected at different positions of the power supply electrode 160, and the same second power supply voltage ELVSS may be transmitted to the different positions of the power supply electrode 160 such that the power supply electrode 160 may have a uniform second power voltage ELVSS throughout the display area DA. For example, as shown in FIG. 1, the first voltage modulator 510-1 may be connected to a left portion of one side of the power supply electrode 160, the fourth voltage modulator 510-4 may be connected to a right portion of one side of the power supply electrode 160, and the second voltage modulator 510-2 and the third voltage modulator 510-3 may be connected to the power supply electrode 160 at intervals (e.g., predetermined intervals) between the left and right portions of the one side of the power supply electrode 160.

Each of the first to fourth connecting members 130-1, 130-2, 130-3, and 130-4 may overlap the display panel 110 in a first pad region PAD1, and may be electrically connected to the display panel 110 through the first pad region PAD1. In addition, each of the first to fourth connecting members 130-1, 130-2, 130-3, and 130-4 may overlap the circuit board 120 in the second pad region PAD2, and may be electrically connected to the circuit board 120 through the second pad region PAD2. An anisotropic conductive film (ACF) may be arranged in the first pad region PAD1 between each of the first to fourth connecting members 130-1, 130-2, 130-3, and 130-4 and the display panel 110, and the display panel 110 and the connecting member 130 may be electrically connected by pressing the display panel 110 and the connecting member 130 with the anisotropic conductive film therebetween. An anisotropic conductive film (ACF) may be arranged in the second pad region PAD2 between each of the first to fourth connecting members 130-1, 130-2, 130-3, and 130-4 and the circuit board 120, and the display panel 110 and the connecting member 130 may be electrically connected by pressing the circuit board 120 and the connecting member 130 with the anisotropic conductive film therebetween. The first to fourth connecting members 130-1, 130-2, 130-3, and 130-4 may include a flexible circuit board (FPCB).

The circuit board 120 may include a signal controller 100, a memory 180, and a power supply 500.

The signal controller 100 may be connected to the first to fourth voltage modulators 510-1, 510-2, 510-3, and 510-4 through a plurality of control lines 123, and may respectively transmit switch control signals SC1, SC2, SC3, and SC4 to the first to fourth voltage modulators 510-1, 510-2, 510-3, and 510-4 through the control lines 123. The control line 123 may be configured of a wire on the circuit board 120, a wire arranged at each of the first to fourth connecting members 130-1, 130-2, 130-3, and 130-4, and a wire on the display panel 110.

In addition, the signal controller 100 may transmit an image data signal to a corresponding data driving circuit portion DIC through the first connecting member 130-1, may transmit an image data signal to a corresponding data driving circuit portion DIC through the second connecting member 130-2, may transmit an image data signal to a corresponding data driving circuit portion DIC through the third connecting member 130-3, and may transmit an image data signal to a corresponding data driving circuit portion DIC through the fourth connecting member 130-4.

The power supply 500 are connected to the first to fourth voltage modulators 510-1, 510-2, 510-3, and 510-4 through a reference voltage line 121, and outputs a reference voltage Vref to the reference voltage line 121. The reference voltage Vref may be a negative voltage for generating the second power supply voltage ELVSS. The reference voltage line 121 may be configured of a wire on the circuit board 120, a wire arranged at each of the first to fourth connecting members 130-1, 130-2, 130-3, and 130-4, and a wire on the display panel 110. The reference voltage Vref outputted from the power supply 500 is transmitted to the first voltage modulator 510-1 through the first connecting member 130-1, is transmitted to the second voltage modulator 510-2 through the second connecting member 130-2, is transmitted to the third voltage modulator 510-3 through the third connecting member 130-3, and is transmitted to the fourth voltage modulator 510-4 through the fourth connecting member 130-4.

In a manufacturing process of the display device, at least one of the first to fourth connecting members 130-1, 130-2, 130-3, and 130-4 may be deviated and misaligned from an accurate or intended position at which it is connected to the display panel 110 and the circuit board 120. As the misalignment error increases, the resistance between the connecting member 130 and the display panel 110 and the resistance between the connecting member 130 and the circuit board 120 increase. The misalignment error may differently occur for the first to fourth connecting members 130-1, 130-2, 130-3, and 130-4.

The reference voltage Vref outputted from the power supply 500, by a voltage drop due to the misalignment error, may be changed to a first reference voltage Vref1 through the first connecting member 130-1 to be inputted to the first voltage modulator 510-1, may be changed to a second reference voltage Vref2 through the second connecting member 130-2 to be inputted to the second voltage modulator 510-2, may be changed to a third reference voltage Vref3 through the third connecting member 130-3 to be inputted to the third voltage modulator 510-3, and may be changed to a fourth reference voltage Vref4 through the fourth connecting member 130-4 to be inputted to the fourth voltage modulator 510-4.

When the first to fourth connecting members 130-1, 130-2, 130-3, and 130-4 are arranged at the accurate positions to be connected to the display panel 110 and the circuit board 120, the voltage drop may be substantially negligible, and the first to fourth reference voltages Vref1, Vref2, Vref3, and Vref4 may substantially become equal to the reference voltage Vref outputted from the power supply 500. However, when the misalignment errors of the first to fourth connecting members 130-1, 130-2, 130-3, and 130-4 are different from each other, the first to fourth reference voltages Vref1, Vref2, Vref3, and Vref4 may be different from each other.

The memory 180 may store the voltage drop or resistance information due to the misalignment error of the first to fourth connecting members 130-1, 130-2, 130-3, and 130-4. The voltage drop or resistance value due to the misalignment error of the first to fourth connecting members 130-1, 130-2, 130-3, and 130-4 may be measured in the manufacturing process of the display device, and the measured value may be stored in the memory 180. Herein, although the memory 180 is separately shown from the signal controller 100, the memory 180 may be included in the signal controller 100 in some example embodiments.

The signal controller 100 may read the voltage drop or resistance value due to the misalignment error of the first to fourth connecting members 130-1, 130-2, 130-3, and 130-4 stored in the memory 180 to generate the switch control signals SC1, SC2, SC3, and SC4 based on the read voltage drop or resistance value. An output voltage of the first voltage modulator 510-1 to which the first reference voltage Vref1 is inputted may be adjusted to the second power supply voltage ELVSS by the first switch control signal SC1. An output voltage of the second voltage modulator 510-2 to which the second reference voltage Vref2 is inputted may be adjusted to the second power supply voltage ELVSS by the second switch control signal SC2. An output voltage of the third voltage modulator 510-3 to which the third reference voltage Vref3 is inputted may be adjusted to the second power supply voltage ELVSS by the third switch control signal SC3. An output voltage of the fourth voltage modulator 510-4 to which the fourth reference voltage Vref4 is inputted may be adjusted to the second power supply voltage ELVSS by the fourth switch control signal SC4.

For example, assuming that the reference voltage Vref outputted from the power supply 500 is −4 V, and by the voltage drop or resistance due to the misalignment error of the first to fourth connecting members 130-1, 130-2, 130-3, and 130-4, the first reference voltage Vref1 is −4 V, the second reference voltage Vref2 is −3 V, the third reference voltage Vref3 is −3 V, and the fourth reference voltage Vref4 is −2 V, the signal controller 100 may allow the output voltages of the first to fourth voltage modulators 510-1, 510-2, 510-3, and 510-4 based on the fourth reference voltage Vref4 having the largest voltage drop (the smallest absolute value of the reference voltages) to become equal to −2 V. That is, the signal controller 100 may adjust the output voltages of the first to fourth voltage modulators 510-1, 510-2, 510-3, and 510-4 to become −2 V. The second power supply voltage ELVSS outputted from the first to fourth voltage modulators 510-1, 510-2, 510-3, and 510-4 may become equal to −2 V.

Hereinafter, an example of the voltage modulator 510 will be described with reference to FIG. 2. In FIG. 2, the first voltage modulator 510-1 of the first to fourth voltage modulators 510-1, 510-2, 510-3, and 510-4 according to some example embodiments will be described.

Figure 2:
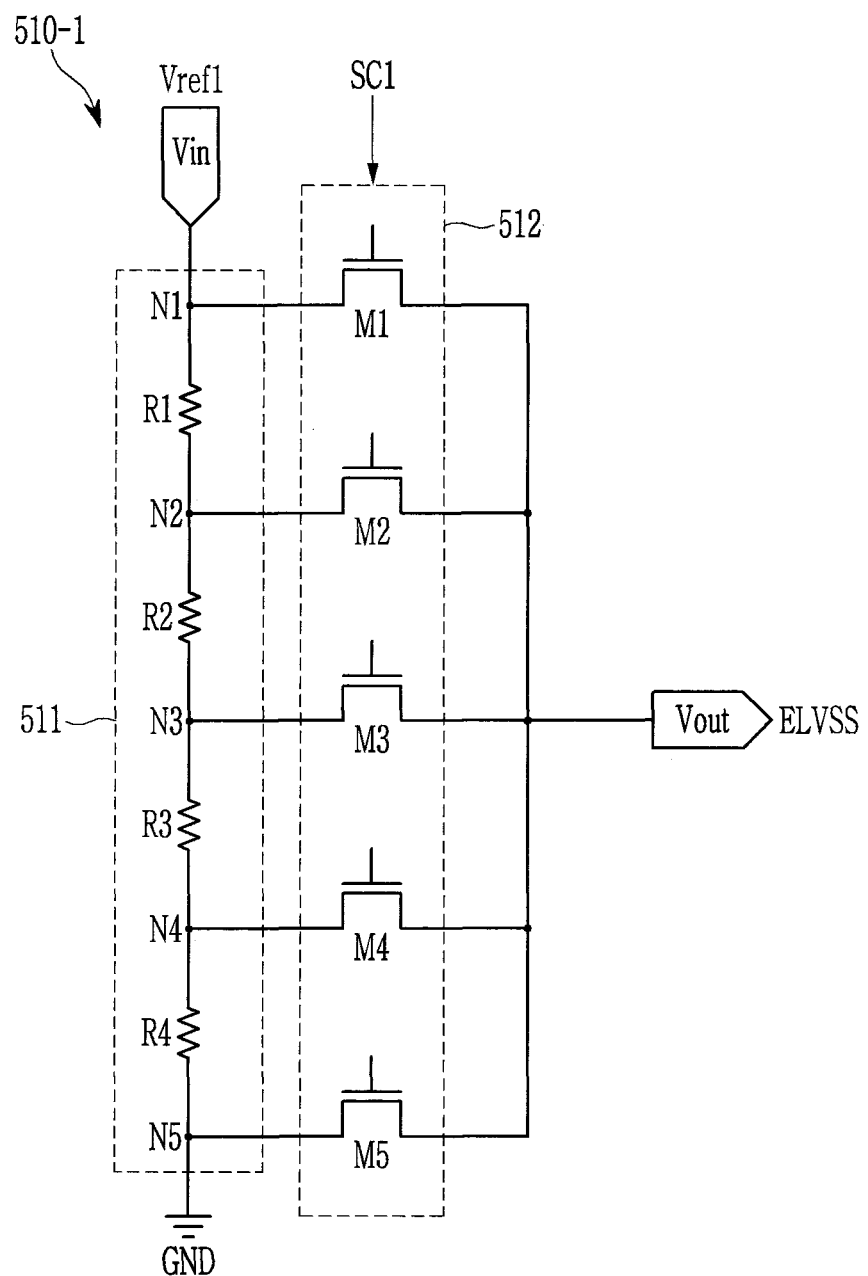
FIG. 2 illustrates a voltage modulator included in the display device of FIG. 1.

FIG. 2 illustrates a voltage modulator included in the display device of FIG. 1.

Referring to FIG. 2, the first voltage modulator 510-1 includes a voltage generator 511 and a switching portion 512.

The voltage generator 511 includes a plurality of resistors R1, R2, R3, and R4 connected in series between an input terminal Vin to which the first reference voltage Vref1 is inputted and a ground GND. Division voltages by the plurality of resistors R1, R2, R3, and R4 are respectively applied to a first node N1 between the input terminal Vin and the first resistor R1, to a second node N2 between the first resistor R1 and the second resistor R2, to a third node N3 between the second resistor R2 and the third resistor R3, to a fourth node N4 between the third resistor R3 and the fourth resistor R4, and to a fifth node N5 between the fourth resistor R4 and the ground GND.

The switching portion 512 includes a plurality of transistors M1, M2, M3, M4, and M5 connected to a plurality of nodes N1, N2, N3, N4, and N5. The first transistor M1 includes a gate electrode to which the first switch control signal SC1 is applied, a first electrode connected to the first node N1, and a second electrode connected to an output terminal Vout. The second transistor M2 includes a gate electrode to which the first switch control signal SC1 is applied, a first electrode connected to the second node N2, and a second electrode connected to the output terminal Vout. The third transistor M3 includes a gate electrode to which the first switch control signal SC1 is applied, a first electrode connected to the third node N3, and a second electrode connected to the output terminal Vout. The fourth transistor M4 includes a gate electrode to which the first switch control signal SC1 is applied, a first electrode connected to the fourth node N4, and a second electrode connected to the output terminal Vout. The fifth transistor M5 includes a gate electrode to which the first switch control signal SC1 is applied, a first electrode connected to the fifth node N5, and a second electrode connected to the output terminal Vout.

The first switch control signal SC1 may include a plurality of signals inputted to the first to fifth transistors M1, M2, M3, M4, and M5, and one of the first to fifth transistors M1, M2, M3, M4, and M5 may be selectively turned on by the first switch control signal SC1. A division voltage of a corresponding node is outputted to the output terminal Vout as the second power supply voltage ELVSS through the turned-on transistor.

For example, assuming that the first reference voltage Vref1 transmitted to the first voltage modulator 510-1 is −4 V and each of the first to fourth resistors R1, R2, R3, and R4 is 1Ω, in order to output −2 V as the second power supply voltage ELVSS, the signal controller 100 may turn on the third transistor M3 to output −2 V applied to the third node N3 to the output terminal Vout.

In FIG. 2, it is described that the voltage generator 511 includes the four resistors R1, R2, R3, and R4 and the switching portion 512 includes the five transistors M1, M2, M3, M4, and M5, but the number of resistors included in the voltage generator 511 and the number of transistors included in the switching portion 512 are not limited thereto.

Structures of the second to fourth voltage modulators 510-2, 510-3, and 510-4 are substantially the same as that of the first voltage modulator 510-1, however there are differences in the voltage inputted to the input terminal Vin and the control signal inputted to the switching portion 512. That is, the second reference voltage Vref2 is inputted to the input terminal Vin of the second voltage modulator 510-2, and the second switch control signal SC2 is inputted to the switching portion 512 of the second voltage modulator 510-2. The third reference voltage Vref3 is inputted to the input terminal Vin of the third voltage modulator 510-3, and the third switch control signal SC3 is inputted to the switching portion 512 of the third voltage modulator 510-3. The fourth reference voltage Vref4 is inputted to the input terminal Vin of the fourth voltage modulator 510-4, and the fourth switch control signal SC4 is inputted to the switching portion 512 of the fourth voltage modulator 510-4. Except for these differences, the structures of the second to fourth voltage modulators 510-2, 510-3, and 510-4 are the same as that of the first voltage modulator 510-1, so a repeated description of the structures of the second to fourth voltage modulators 510-2, 510-3, and 510-4 is omitted.

As described above with reference to FIG. 1 and FIG. 2, by using the voltage modulator 510, it is possible to prevent a level difference of the second power supply voltage ELVSS that may occur when the display panel 110 and the circuit board 120 are connected to the plurality of connecting members 130-1, 130-2, 130-3, and 130-4. Therefore, it is possible to prevent luminance of the display panel 100 from not being constant for respective areas of the display panel, or to prevent an image of a luminance that is different from a desired luminance from being displayed.

Hereinafter, a display device according to some example embodiments of the present invention will be described with reference to FIG. 3. Compared with the example embodiments of FIG. 1 and FIG. 2 described above, differences will be mainly described.

Figure 3:
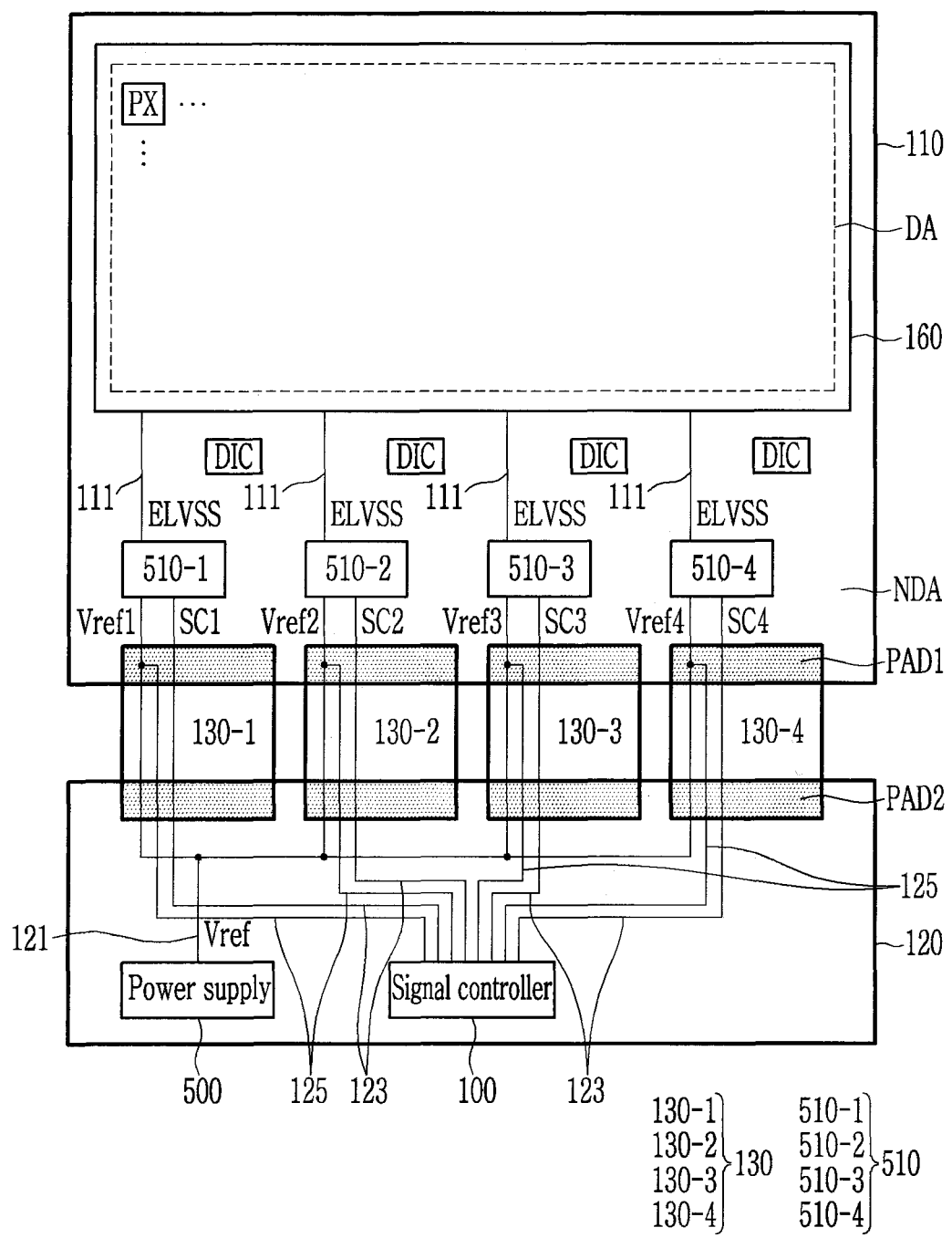
FIG. 3 illustrates a display device according to some example embodiments of the present invention.

FIG. 3 illustrates a display device according to some example embodiments of the present invention.

Referring to FIG. 3, in the display device, a plurality of feedback lines 125 may be further included, and the memory 180 of FIG. 1 may be omitted. A number of the feedback lines 125 may correspond to the number of the first to fourth connecting members 130-1, 130-2, 130-3, and 130-4, and the feedback line 125 may be connected to the reference voltage line 121 in the first pad region PAD1 of each of the first to fourth connecting members 130-1, 130-2, 130-3, and 130-4. That is, each of the plurality of feedback lines 125 may include, in the first pad region PAD1, one terminal connected to the reference voltage line 121 and the other terminal connected to the signal controller 100.

A voltage of the reference voltage line 121 may be fed back to the signal controller 100 in the first pad region PAD1 through the feedback line 125. That is, the first reference voltage Vref1 may be fed back to the signal controller 100 through the feedback line 125 connected to the reference voltage line 121 in the first pad region PAD1 of the first connecting member 130-1. In addition, the second reference voltage Vref2 may be fed back to the signal controller 100 through the feedback line 125 connected to the reference voltage line 121 in the first pad region PAD1 of the second connecting member 130-2. The third reference voltage Vref3 may be fed back to the signal controller 100 through the feedback line 125 connected to the reference voltage line 121 in the first pad region PAD1 of the third connecting member 130-3. The fourth reference voltage Vref3 may be fed back to the signal controller 100 through the feedback line 125 connected to the reference voltage line 121 in the first pad region PAD1 of the fourth connecting member 130-4.

The signal controller 100 may detect the voltage drop or resistance value due to the misalignment error of the first to fourth connecting members 130-1, 130-2, 130-3, and 130-4 based on the fed back first to fourth reference voltages Vref1, Vref2, Vref3, and Vref4, and it may generate the switch control signals SC1, SC2, SC3, and SC4 corresponding thereto.

Except for these differences, the features of the example embodiment described above with reference to FIG. 1 and FIG. 2 may be wholly applied to the example embodiment described with reference to FIG. 3, so that redundant descriptions are omitted.

Hereinafter, a display device according to another example embodiment of the present invention will be described with reference to FIG. 4 and FIG. 5. Compared with the example embodiments of FIG. 1 and FIG. 2 described above, differences will be mainly described.

Figure 4:
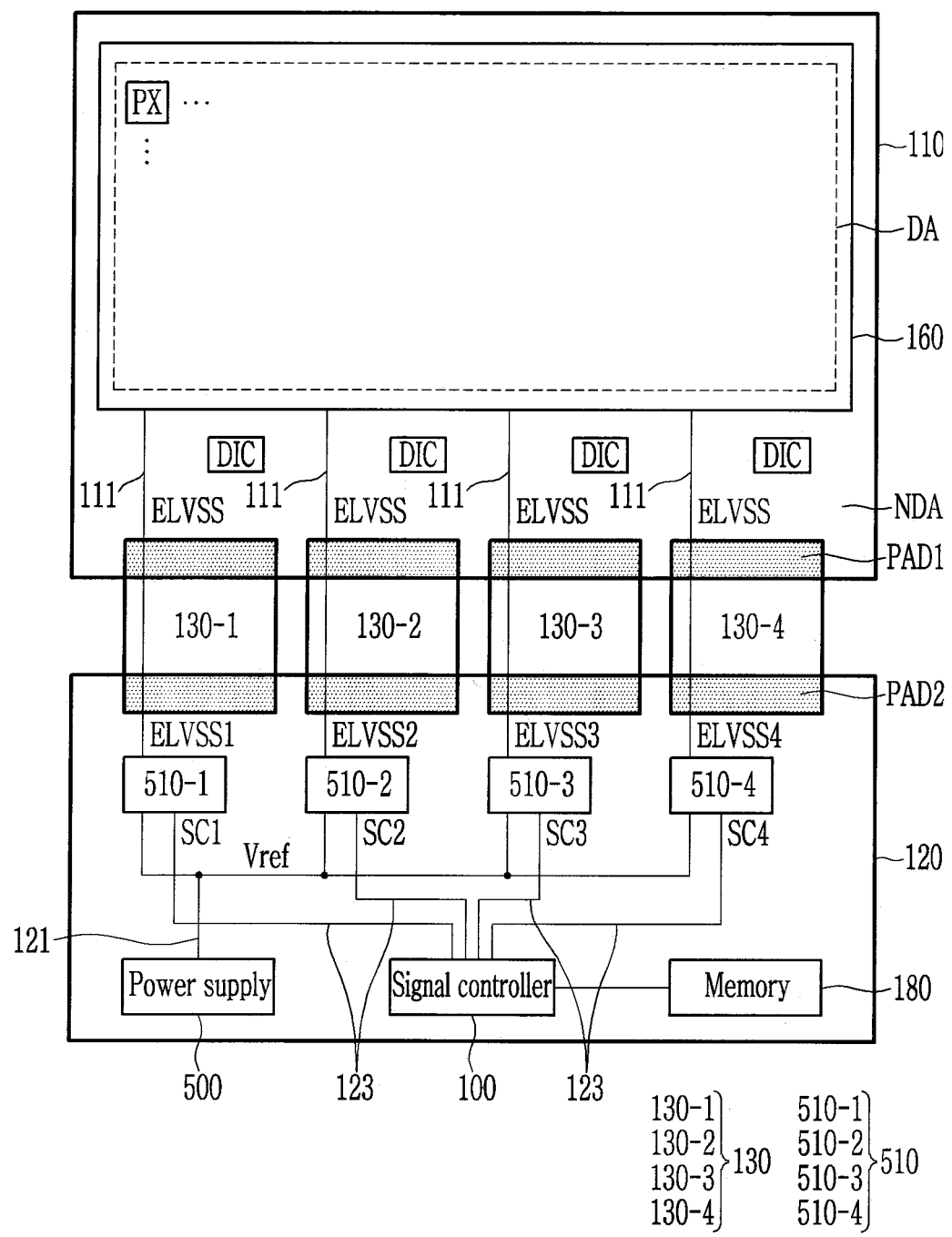
FIG. 4 illustrates a display device according to some example embodiments of the present invention.

FIG. 4 illustrates a display device according to another example embodiment of the present invention. FIG. 5 illustrates a voltage modulator included in the display device of FIG. 4.

Referring to FIG. 4, the first to fourth voltage modulators 510-1, 510-2, 510-3, and 510-4 are arranged on the circuit board 120. The power supply line 111 connected to each of the first to fourth voltage modulators 510-1, 510-2, 510-3, and 510-4 may be configured of a wire on the circuit board 120, a wire arranged at each of the first to fourth connecting members 130-1, 130-2, 130-3, and 130-4, and a wire on the display panel 110. The reference voltage line 121 may be formed on the circuit board 120 to connect the first to fourth voltage modulators 510-1, 510-2, 510-3, and 510-4 to the power supply 500. The plurality of control lines 123 may be formed on the circuit board 120 to respectively connect the first to fourth voltage modulators 510-1, 510-2, 510-3, and 510-4 to the signal controller 100.

As the first to fourth voltage modulators 510-1, 510-2, 510-3, and 510-4 are arranged on the circuit board 120, the reference voltage Vref outputted from the power supply 500 may be inputted to the first to fourth voltage modulators 510-1, 510-2, 510-3, and 510-4.

The signal controller 100 may generate the switch control signals SC1, SC2, SC3, and SC4 so that the first to fourth voltage modulators 510-1, 510-2, 510-3, and 510-4 may output first to fourth adjustment power supply voltages ELVSS1, ELVSS2, ELVSS3, and ELVSS4 based on information of the voltage drop or resistance due to the misalignment error of the first to fourth connecting members 130-1, 130-2, 130-3, and 130-4 stored in the memory 180.

The first voltage modulator 510-1 may output the first adjustment power supply voltage ELVSS1 based on the reference voltage Vref according to the first switch control signal SC1. The first adjustment power supply voltage ELVSS1 is changed to the second power supply voltage ELVSS by the voltage drop or resistance due to the misalignment error of the first connecting member 130-1, and is transmitted to the power supply electrode 160. The first adjustment power supply voltage ELVSS1 may be a voltage corresponding to a sum of a value of the voltage drop due to the first connecting member 130-1 and the second power supply voltage ELVSS.

The second voltage modulator 510-2 may output the second adjustment power supply voltage ELVSS2 based on the reference voltage Vref according to the second switch control signal SC2. The second adjustment power supply voltage ELVSS2 is changed to the second power supply voltage ELVSS by the voltage drop or resistance due to the misalignment error of the second connecting member 130-2, and is transmitted to the power supply electrode 160. The second adjustment power supply voltage ELVSS2 may be a voltage corresponding to a sum of a value of the voltage drop due to the second connecting member 130-2 and the second power supply voltage ELVSS.

The third voltage modulator 510-3 may output the third adjustment power supply voltage ELVSS3 based on the reference voltage Vref according to the third switch control signal SC3. The third adjustment power supply voltage ELVSS3 is changed to the second power supply voltage ELVSS by the voltage drop or resistance due to the misalignment error of the third connecting member 130-3, and is transmitted to the power supply electrode 160. The third adjustment power supply voltage ELVSS3 may be a voltage corresponding to a sum of a value of the voltage drop due to the third connecting member 130-3 and the second power supply voltage ELVSS.

The fourth voltage modulator 510-4 may output the fourth adjustment power supply voltage ELVSS4 based on the reference voltage Vref according to the fourth switch control signal SC4. The fourth adjustment power supply voltage ELVSS4 is changed to the second power supply voltage ELVSS by the voltage drop or resistance due to the misalignment error of the fourth connecting member 130-4, and is transmitted to the power supply electrode 160. The fourth adjustment power supply voltage ELVSS4 may be a voltage corresponding to a sum of a value of the voltage drop due to the fourth connecting member 130-4 and the second power supply voltage ELVSS.

For example, assuming that the reference voltage Vref outputted from the power supply 500 is −4 V, and by the voltage drop or resistance due to the misalignment error of the first to fourth connecting members 130-1, 130-2, 130-3, and 130-4, the first reference voltage Vref1 is −4 V, the second reference voltage Vref2 is −3 V, the third reference voltage Vref3 is −3 V, and the fourth reference voltage Vref4 is −2 V, the signal controller 100 may control, based on the voltage drop of the fourth reference voltage Vref4 having the largest absolute value of the voltage drop, the first adjustment power supply voltage ELVSS1 of the first voltage modulator 510-1 to be outputted to −2 V, the second adjustment power supply voltage ELVSS2 of the second voltage modulator 510-2 to be outputted to −3 V, the third adjustment power supply voltage ELVSS3 of the third voltage modulator 510-3 to be outputted to −3 V, and the fourth adjustment power supply voltage ELVSS4 of the fourth voltage modulator 510-4 to be outputted to −4 V. Each of the first to fourth adjustment power supply voltages ELVSS1, ELVSS2, ELVSS3, and ELVSS4 may be maintained or changed to −2 V by the voltage drop to be applied to the power supply electrode 160 as the second power supply voltage ELVSS.

Figure 5:
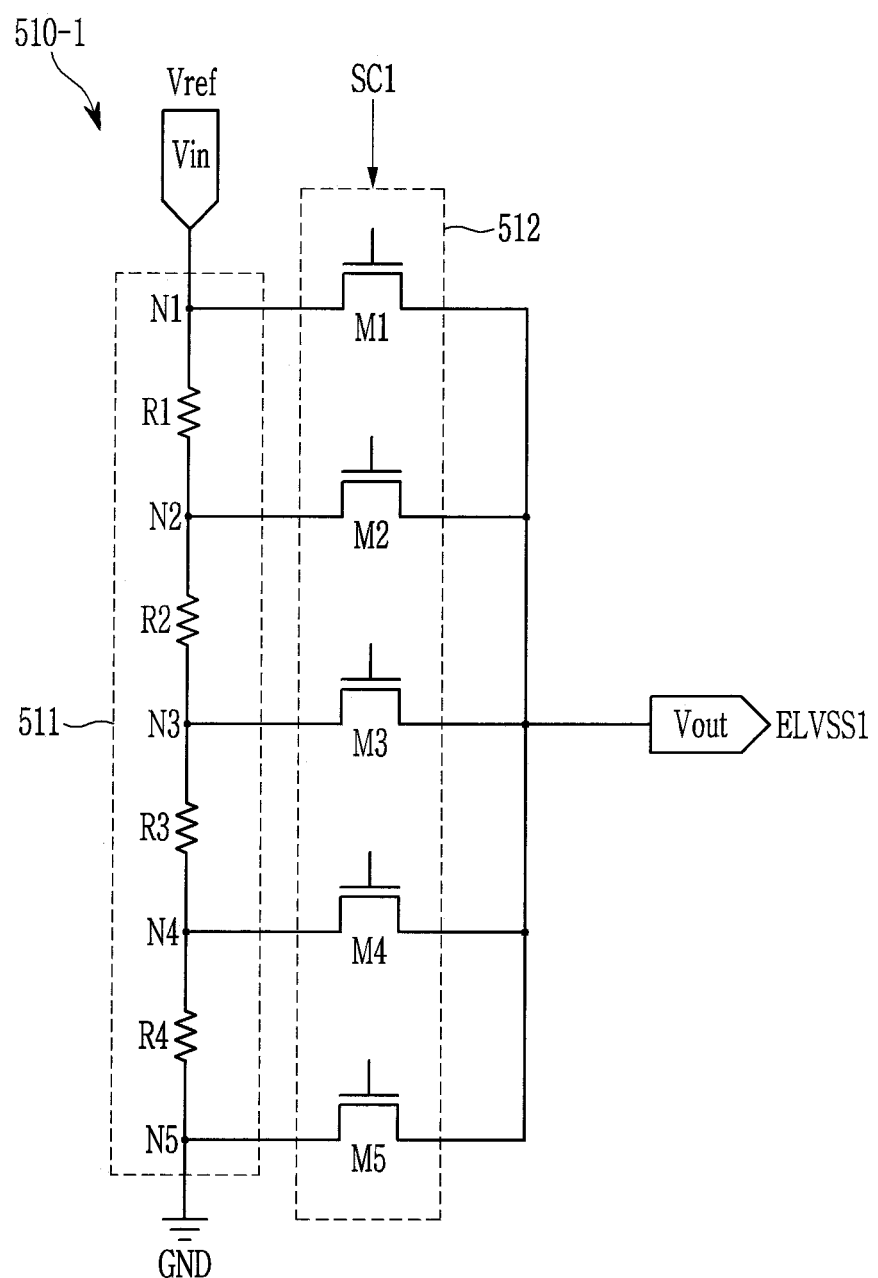
FIG. 5 illustrates a voltage modulator included in the display device of FIG. 4.

In FIG. 5, the first voltage modulator 510-1 of the first to fourth voltage modulators 510-1, 510-2, 510-3, and 510-4 according to some example embodiments will be described.

Referring to FIG. 5, the reference voltage Vref is inputted to the input terminal Vin of the voltage generator 511, and the first adjustment power supply voltage ELVSS1 is outputted to the output terminal Vout.

The structures of the second to fourth voltage modulators 510-2, 510-3, and 510-4 are substantially the same as the structure of the first voltage modulator 510-1 of FIG. 5. However, the second switch control signal SC2 is inputted to the switching portion 512 of the second voltage modulator 510-2, the second adjustment power supply voltage ELVSS2 is outputted to the output terminal Vout, the third switch control signal SC3 is inputted to the switching portion 512 of the third voltage modulator 510-3, the third adjustment power supply voltage ELVSS3 is outputted to the output terminal Vout, the fourth switch control signal SC4 is inputted to the switching portion 512 of the fourth voltage modulator 510-4, and the fourth adjustment power supply voltage ELVSS4 is outputted to the output terminal Vout.

Except for the differences described above in FIG. 4 and FIG. 5, the features of the example embodiment described above with reference to FIG. 1 and FIG. 2 may be wholly applied to the example embodiment described with reference to FIG. 4 and FIG. 5, so that redundant descriptions are omitted.

Hereinafter, referring to FIG. 6, a display device according to another example embodiment of the present invention will be described. Compared with the example embodiment of FIG. 1 described above, differences will be mainly described.

Figure 6:
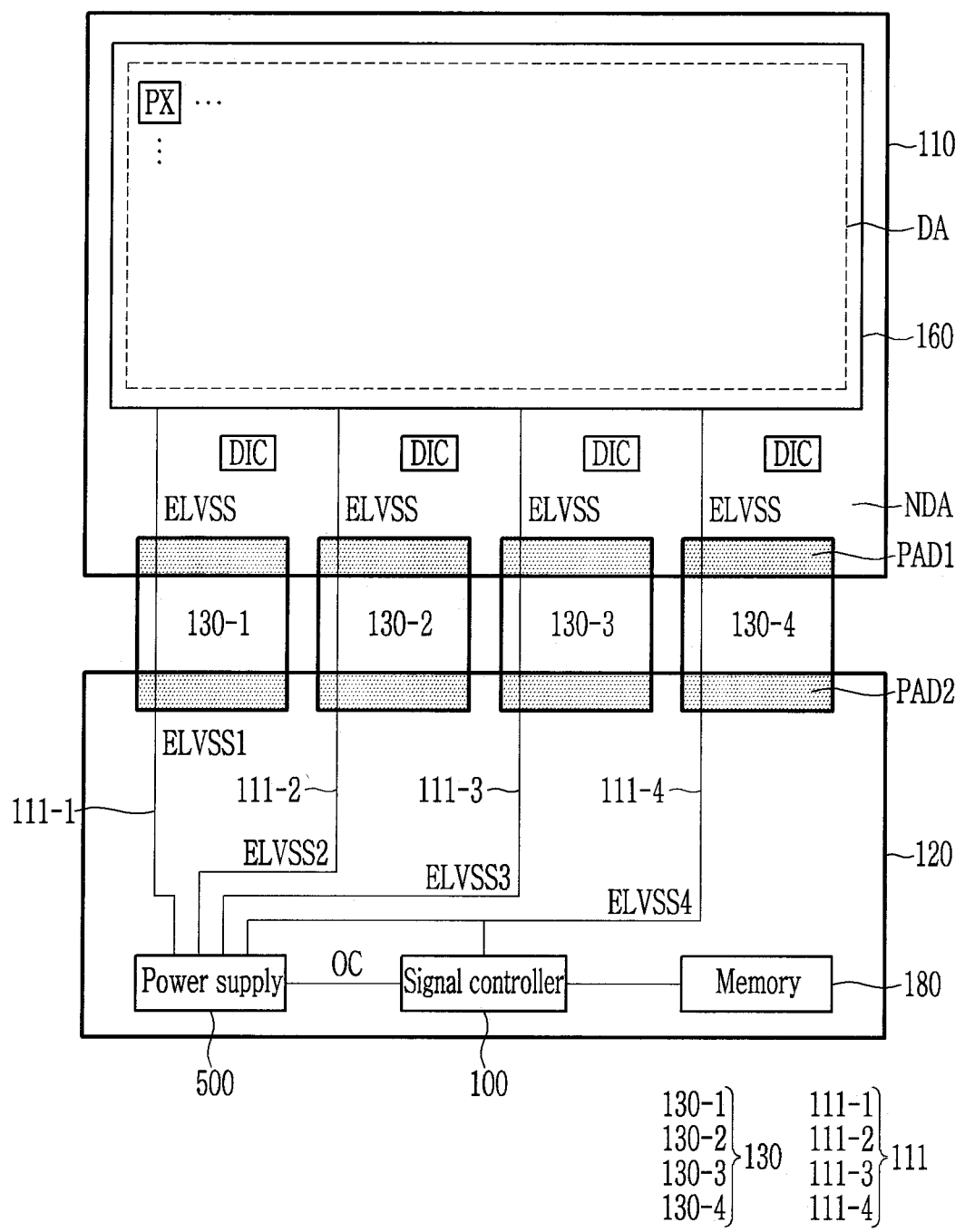
FIG. 6 illustrates a display device according to some example embodiments of the present invention.

FIG. 6 illustrates a display device according to another example embodiment of the present invention.

Referring to FIG. 6, the display device includes a plurality of the power supply lines 111 for connecting the power supply 500 and the power supply electrode 160. That is, the display device may include a first power supply line 111-1 for connecting the power supply 500 and the power supply electrode 160 through the first connecting member 130-1, a second power supply line 111-2 for connecting the power supply 500 and the power supply electrode 160 through the second connecting member 130-2, a third power supply line 111-3 for connecting the power supply 500 and the power supply electrode 160 through the third connecting member 130-3, and a fourth power supply line 111-4 for connecting the power supply 500 and the power supply electrode 160 through the fourth connecting member 130-4. The voltage modulator 510 and the plurality of control lines 123 of FIG. 1 are omitted.

The signal controller 100 reads the information of the voltage drop or resistance value due to the misalignment error of the first to fourth connecting members 130-1, 130-2, 130-3, and 130-4 stored in the memory 180, and provides an output control signal OC to the power supply 500 based on the read information. The output control signal OC is a signal for controlling the output of the power supply 500.

According to the output control signal OC, the power supply 500 outputs the first adjustment power supply voltage ELVSS1 to first the power supply line 111-1, outputs the second adjustment power supply voltage ELVSS2 to the second power supply line 111-2, outputs the third adjustment power supply voltage ELVSS3 to the third power supply line 111-3, and outputs the fourth adjustment power supply voltage ELVSS4 to the fourth power supply line 111-4. At least one of the first to fourth adjustment power supply voltages ELVSS1, ELVSS2, ELVSS3, and ELVSS4 may be a voltage that is different from the remaining thereof. The first to fourth adjustment power supply voltages ELVSS1, ELVSS2, ELVSS3, and ELVSS4 may be negative voltages.

The first adjustment power supply voltage ELVSS1 is changed to the second power supply voltage ELVSS by the voltage drop or resistance due to the misalignment error of the first connecting member 130-1, and is transmitted to the power supply electrode 160. The first adjustment power supply voltage ELVSS1 may be a voltage corresponding to a sum of a value of the voltage drop due to the first connecting member 130-1 and the second power supply voltage ELVSS.

The second adjustment power supply voltage ELVSS2 is changed to the second power supply voltage ELVSS by the voltage drop or resistance due to the misalignment error of the second connecting member 130-2, and is transmitted to the power supply electrode 160. The second adjustment power supply voltage ELVSS2 may be a voltage corresponding to a sum of a value of the voltage drop due to the second connecting member 130-2 and the second power supply voltage ELVSS.

The third adjustment power supply voltage ELVSS3 is changed to the second power supply voltage ELVSS by the voltage drop or resistance due to the misalignment error of the third connecting member 130-3, and is transmitted to the power supply electrode 160. The third adjustment power supply voltage ELVSS3 may be a voltage corresponding to a sum of a value of the voltage drop due to the third connecting member 130-3 and the second power supply voltage ELVSS.

The fourth adjustment power supply voltage ELVSS4 is changed to the second power supply voltage ELVSS by the voltage drop or resistance due to the misalignment error of the fourth connecting member 130-4, and is transmitted to the power supply electrode 160. The fourth adjustment power supply voltage ELVSS4 may be a voltage corresponding to a sum of a value of the voltage drop due to the fourth connecting member 130-4 and the second power supply voltage ELVSS.

That is, the first to fourth adjustment power supply voltages ELVSS1, ELVSS2, ELVSS3, and ELVSS4 outputted to each of the first to fourth power supply lines 111-1, 111-2, 111-3, and 111-4 from the power supply 500 may be adjusted so that a voltage applied to the power supply electrode 160 through the first to fourth connecting members 130-1, 130-2, 130-3, and 130-4 becomes equal to the second power supply voltage ELVSS. Accordingly, it is possible to prevent (or reduce) instances of a level difference of the second power supply voltage ELVSS that may occur when the display panel 110 and the circuit board 120 are connected to the plurality of connecting members 130-1, 130-2, 130-3, and 130-4.

Except for these differences, the features of the example embodiment described above with reference to FIG. 1 may be wholly applied to the example embodiment described with reference to FIG. 6, so that redundant descriptions are omitted.

Hereinafter, referring to FIG. 7, a display device according to another example embodiment of the present invention will be described. Compared with the example embodiment of FIG. 6 described above, differences will be mainly described.

Figure 7:
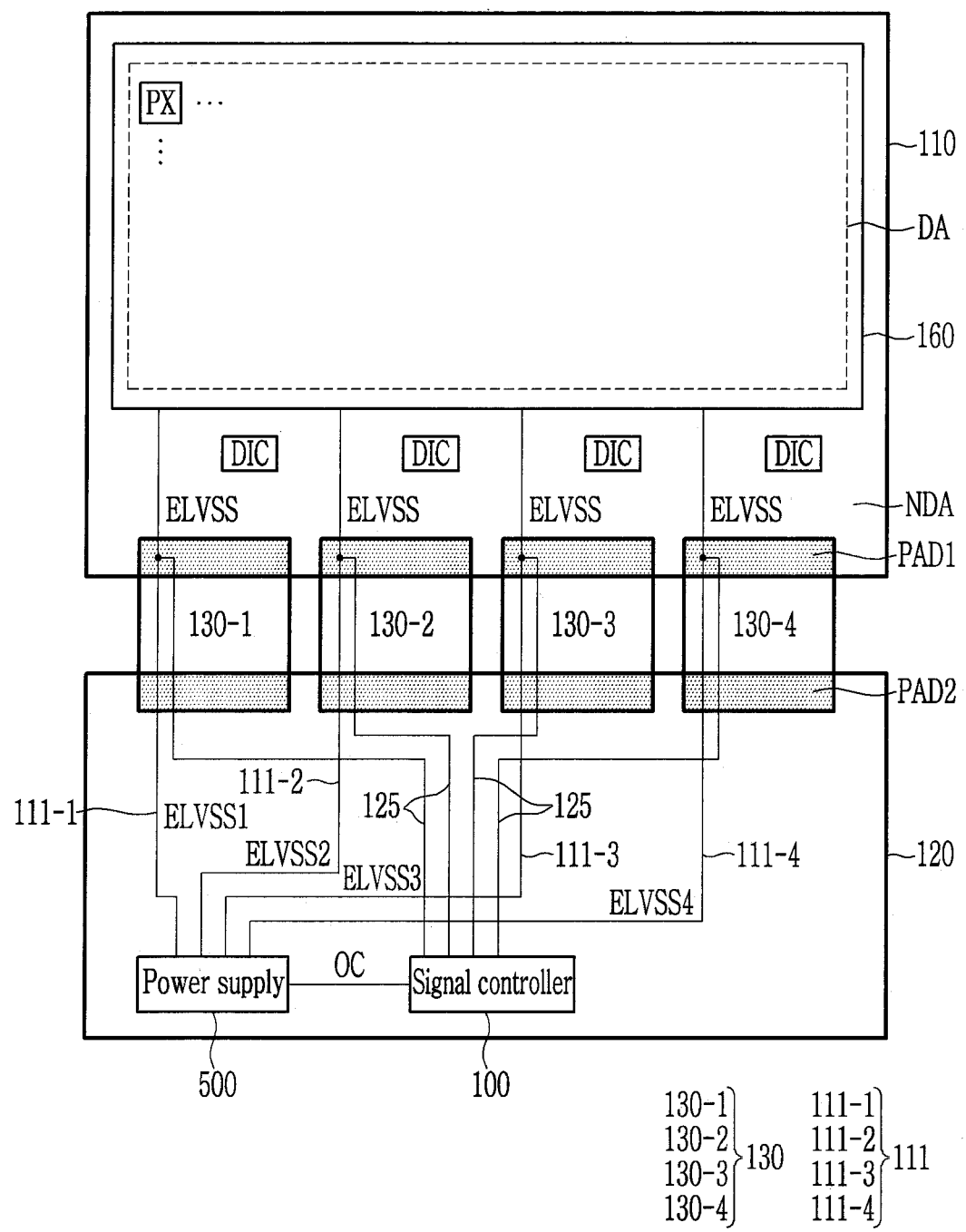
FIG. 7 illustrates a display device according to some example embodiments of the present invention.

FIG. 7 illustrates a display device according to some example embodiments of the present invention.

Referring to FIG. 7, in the display device, the plurality of feedback lines 125 may be further included, and the memory 180 of FIG. 6 may be omitted. The number of the feedback lines 125 may correspond to the number of the first to fourth connecting members 130-1, 130-2, 130-3, and 130-4, and the feedback line 125 may be connected to each of the first to fourth power supply lines 111-1, 111-2, 111-3, and 111-4 in the first pad region PAD1 of each of the first to fourth connecting members 130-1, 130-2, 130-3, and 130-4. That is, one feedback line 125 includes, in the first pad region PAD1 of the first connecting member 130-1, one terminal connected to the first the power supply line 111-1 and the other terminal connected to the signal controller 100. Another feedback line 125 includes, in the first pad region PAD1 of the second connecting member 130-2, one terminal connected to the second the power supply line 111-2 and the other terminal connected to the signal controller 100. Another feedback line 125 includes, in the first pad region PAD1 of the third connecting member 130-3, one terminal connected to the third the power supply line 111-3 and the other terminal connected to the signal controller 100. Another feedback line 125 includes, in the first pad region PAD1 of the fourth connecting member 130-4, one terminal connected to the fourth the power supply line 111-4 and the other terminal connected to the signal controller 100.

A voltage of each of the first to fourth power supply lines 111-1, 111-2, 111-3, and 111-4 may be fed back to the signal controller 100 in each of the first to fourth connecting members 130-1, 130-2, 130-3, and 130-4 in each first pad region PAD1 through the plurality of feedback lines 125.

The signal controller 100 checks whether a voltage fed back through the plurality of feedback lines 125 becomes equal to the second power supply voltage ELVSS, and when the fed back voltage does not become equal to the second power supply voltage ELVSS, the signal controller 100 transmits the output control signal OC for controlling the output of the power supply 500.

According to the output control signal OC, the power supply 500 may adjust and output values of the first adjustment power supply voltage ELVSS1, the second adjustment power supply voltage ELVSS2, the third adjustment power supply voltage ELVSS3, and the fourth adjustment power supply voltage ELVSS1. The first to fourth adjustment power supply voltages ELVSS1, ELVSS2, ELVSS3, and ELVSS4 are changed to the second power supply voltage ELVSS through the first to fourth connecting members 130-1, 130-2, 130-3, and 130-4, and is transmitted to the power supply electrode 160.

Except for these differences, the features of the example embodiment described above with reference to FIG. 6 may be wholly applied to the example embodiment described with reference to FIG. 7, so that redundant descriptions are omitted.

Hereinafter, a display device and a pixel according to an example embodiment will be described with reference to FIG. 8 and FIG. 9.

Figure 8:
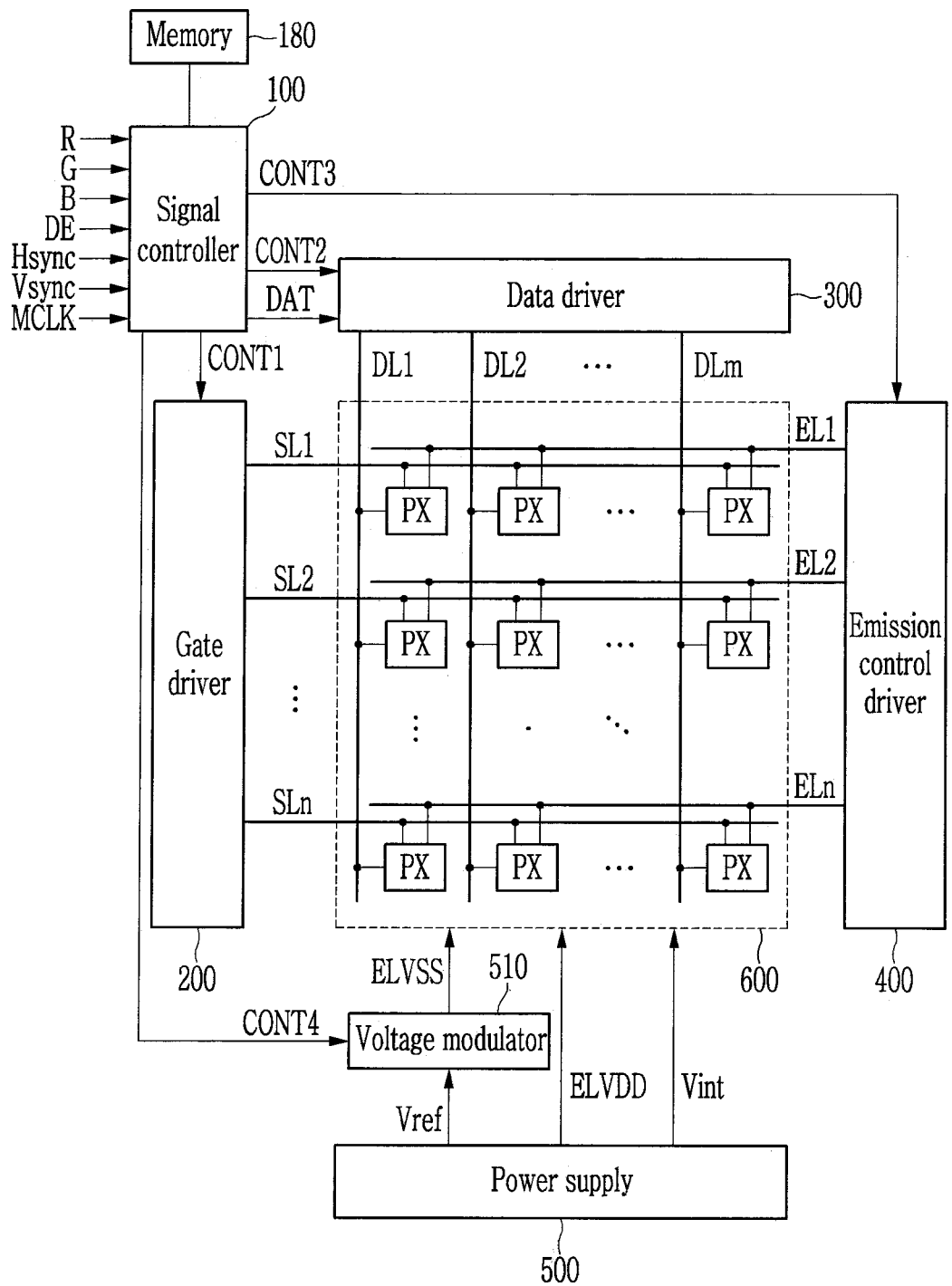
FIG. 8 illustrates a display device according to some example embodiments of the present invention.

FIG. 8 illustrates a display device according to some example embodiments of the present invention.

Referring to FIG. 8, the display device includes a signal controller 100, a memory 180, a gate driver 200, a data driver 300, an emission control driver 400, a power supply 500, a voltage modulator 510, and a display unit 600. The data driver 300 may include the data driving circuit portion DIC described above with reference to FIG. 1. The display unit 600 may correspond to the display area DA described above with reference to FIG. 1.

The signal controller 100 receive image signals R, G, and B inputted from an external device, and an input control signal for controlling the display thereof. The image signals R, G, and B have luminance information for each pixel PX, and the luminance thereof has a number (e.g., a predetermined number) of gray levels. The input control signal, for example, includes a data enable signal DE, a horizontal synchronizing signal Hsync, a vertical synchronizing signal Vsync, and a main clock signal MCLK.

The signal controller 100 appropriately adjusts the input image signals R, G, and B based on the input image signals R, G, and B and the input control signal according to operating conditions of the display unit 600 and the data driver 300, and generates a first control signal CONT1, a second control signal CONT2, an image data signal DAT, a third control signal CONT3, and a fourth control signal CONT4. The signal controller 100 transmits the first control signal CONT1 to the gate driver 200, transmits the second control signal CONT2 and the image data signal DAT to the data driver 300, transmits the third control signal CONT3 to the emission control driver 400, and transmits the fourth control signal CONT4 to the voltage modulator 510. The signal controller 100 may generate the fourth control signal CONT4 based on information stored in the memory 180. The memory 180 may correspond to the memory 180 described above with reference to FIG. 1, and the fourth control signal CONT4 may include the switch control signals SC1, SC2, SC3, and SC4 described above with reference to FIG. 1.

The display unit 600 includes a plurality of gate lines (SL1-SLn), a plurality of data lines (DL1-DLm), a plurality of emission control lines (EL1-ELn), and a plurality of pixels PX. The plurality of pixels PX may be connected to the plurality of gate lines (SL1-SLn), the plurality of data lines (DL1-DLm), and the plurality of emission control lines (EL1-ELn) to be substantially arranged in a matrix form. The plurality of gate lines (SL1-SLn) substantially extend in a row direction to be substantially parallel to each other. The plurality of emission control lines (EL1-ELn) substantially extend in a row direction to be substantially parallel to each other. The plurality of data lines (DL1-DLm) substantially extend in a row direction to be substantially parallel to each other.

The gate driver 200 is connected to the plurality of gate lines (SL1-SLn), and applies a gate signal including a gate-on voltage and a gate-off voltage according to the first control signal CONT1 to the plurality of gate lines (SL1-SLn). The gate driver 200 may be arranged in the non-display area NDA described above with reference to FIG. 1.

The data driver 300 is connected to the plurality of data lines (DL1-DLm), and generates a data voltage according to the image data signal DAT. The data driver 300 may apply the data voltage to the plurality of data lines (DL1-DLm) according to the second control signal CONT2.

The emission control driver 400 may be connected to the plurality of emission control lines (EL1-ELn), and may apply an emission control signal including a gate-on voltage and a gate-off voltage to the plurality of emission control lines (EL1-ELn) according to the third control signal CONT3. The emission control driver 400 may be arranged in the non-display area NDA described above with reference to FIG. 1.

The power supply 500 provides a first power voltage ELVDD and an initialization voltage Vint to the plurality of pixels PX. In addition, the power supply 500 may output the reference voltage Vref to the voltage modulator 510, and the voltage modulator 510 may generate the second power supply voltage ELVSS with a division voltage using the reference voltage Vref to supply it to the plurality of pixels PX. The voltage modulator 510 may correspond to the voltage modulator 510 described above with reference to FIG. 1 and FIG. 2. The first power voltage ELVDD may be a high level voltage provided to an anode electrode of a light-emitting diode (see an LED of FIG. 9) included in each of the plurality of pixels PX. The second power voltage ELVSS may be a low level voltage provided to a cathode electrode of a light-emitting diode included in each of the plurality of pixels PX. The second power supply voltage ELVSS may be applied to the power supply electrode 160 described above with reference to FIG. 1. The first power voltage ELVDD and the second power voltage ELVSS are driving voltages for causing the plurality of pixels PX to emit light.

Figure 9:
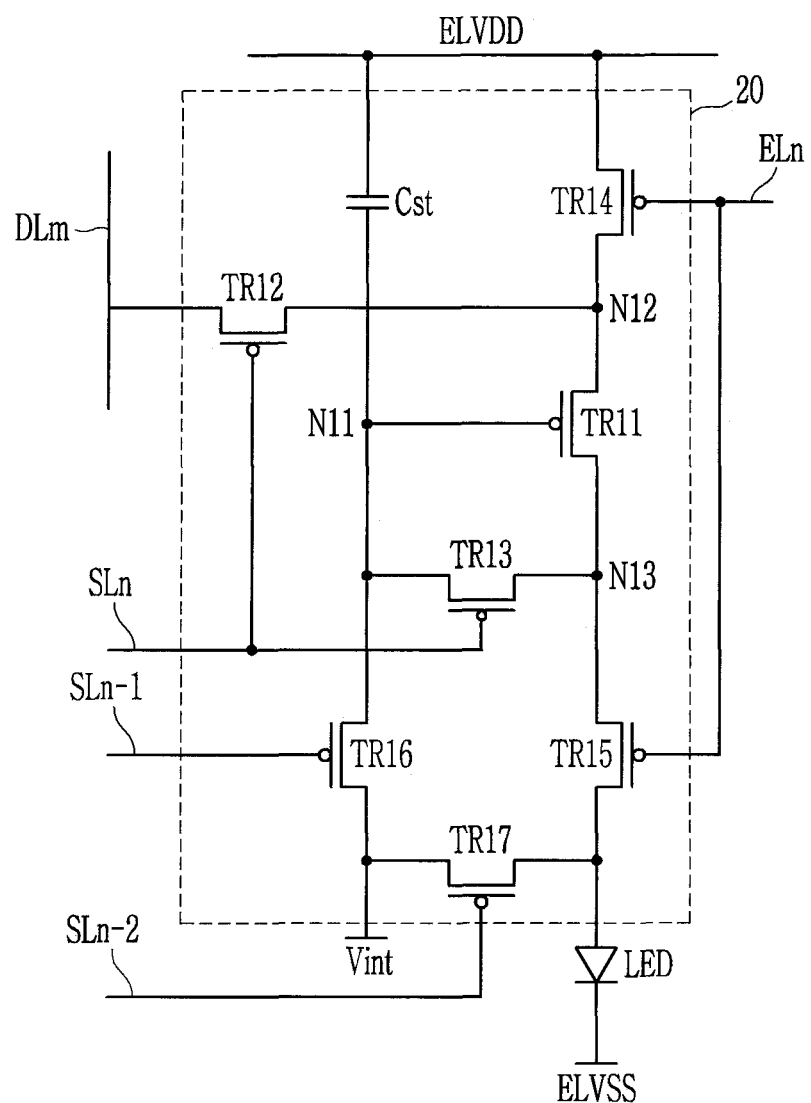
FIG. 9 illustrates a pixel according to some example embodiments of the present invention.

FIG. 9 illustrates a pixel according to some example embodiments of the present invention. A pixel PX arranged at an n-th pixel row and an m-th pixel column among the plurality of pixels PX included in the display device of FIG. 8 will be described as an example.

Referring to FIG. 9, the pixel PX includes a pixel circuit 20 for controlling the light-emitting diode LED and a current flowing to the light-emitting diode LED. The pixel circuit 20 may include a driving transistor TR11, a switching transistor TR12, a compensation transistor TR13, a first emission control transistor TR14, a second emission control transistor TR15, a first initialization transistor TR16, a second initialization transistor TR17, and a storage capacitor Cst.

The driving transistor TR11 includes a gate electrode connected to a first node N11, one terminal connected to a second node N12, and the other terminal connected to a third node N13. The driving transistor TR11 controls an amount of current flowing from the first power voltage ELVDD to the light-emitting diode LED corresponding to a voltage of the first node N11.

The switching transistor TR12 includes a gate electrode connected to a first gate line SLn, one terminal connected to a data line DLm, and the other terminal connected to the second node N12. The switching transistor TR12 is turned on depending on a first gate signal of a gate-on voltage applied to the first gate line SLn to transmit a data voltage applied to the data line DLm to the second node N12.

The compensation transistor TR13 includes a gate electrode connected to the first gate line SLn, one terminal connected to the third node N13, and the other terminal connected to the first node N11. The compensation transistor TR13 is turned on depending on the gate signal of the gate-on voltage applied to the first gate line SLn to diode-connect the driving transistor TR11, thereby compensating a threshold voltage of the driving transistor TR11.

The first emission control transistor TR14 includes a gate electrode connected to an emission control line ELn, one terminal connected to the first power voltage ELVDD, and the other terminal connected to the second node N12.

The second emission control transistor TR15 includes a gate electrode connected to the emission control line ELn, one terminal connected to the third node N13, and the other terminal connected to the anode of the light-emitting diode LED. The first emission control transistor TR14 and the second emission control transistor TR15 are turned on depending on the emission control signal of the gate-on voltage applied to the emission control line ELn to allow a current to flow to the light-emitting diode LED through the driving transistor TR11 from the first power voltage ELVDD.

The first initialization transistor TR16 includes a gate electrode connected to a second gate line SLn-1, one terminal connected to the initialization voltage Vint, and the other terminal connected to the first node N11. The first initialization transistor TR16 may be turned on depending on a second gate signal of a gate-on voltage applied to the second gate line SLn-1, and may transmit the initialization voltage Vint to the first node N11, thereby initializing the gate voltage of the driving transistor TR11.

The second initialization transistor TR17 includes a gate electrode connected to a third gate line SLn-2, one terminal connected to the initialization voltage Vint, and the other terminal connected to the anode of the light-emitting diode LED. The second initialization transistor TR17 may be turned on depending on a third gate signal of the gate-on voltage applied to the third gate line SLn-2, and may transmit the initialization voltage Vint to the anode of the light-emitting diode LED, thereby initializing the light-emitting diode LED.

The storage capacitor Cst includes one terminal connected to the first power voltage ELVDD and the other terminal connected to the first node N11. The data voltage compensated for the threshold voltage of the driving transistor TR11 is applied to the first node N11, and the storage capacitor Cst serves to maintain a voltage of the first node N11.

The light-emitting diode LED includes the anode connected to the other terminal of the second emission control transistor TR15 and the cathode connected to the second power voltage ELVSS. The light-emitting diode LED may be connected between the pixel circuit 20 and the second power voltage ELVSS to emit light with a luminance corresponding to a current provided from the pixel circuit 20. The light-emitting diode LED may emit light of one of primary colors, or white light. The primary colors may be three primary colors such as red, green, and blue. Alternatively, the primary colors may be yellow, cyan, magenta, etc.

The accompanying drawings and the detailed description of the invention are only illustrative, and are used for the purpose of describing the present invention but are not used to limit the meanings or scope of the present invention described in the claims. Therefore, those skilled in the art will understand that various modifications and other equivalent embodiments of the present invention are possible. Consequently, the true technical protective scope of the present invention must be determined based on the technical spirit of the appended claims, and their equivalents.

What is claimed is:

1. A display device comprising:
   a display panel comprising a plurality of pixels;
   a circuit board comprising:
      a power supply configured to output a reference voltage; and
      a signal controller;
   a connecting member electrically connecting the display panel and the circuit board; and
   a voltage modulator configured to generate a second power supply voltage of a low level based on a voltage drop of the connecting member and to supply the second power supply voltage to the plurality of pixels.

2. The display device of claim 1, further comprising:
   a plurality of data driving circuit portions configured to apply a data voltage to the plurality of pixels,
   wherein the connecting member includes a first connecting member and a second connecting member corresponding to different data driving circuit portions, and
   the voltage modulator includes a first voltage modulator corresponding to the first connecting member and a second voltage modulator corresponding to the second connecting member.

3. The display device of claim 2, wherein
   the first voltage modulator and the second voltage modulator are on the display panel,
   the reference voltage is changed to a first reference voltage by a voltage drop due to the first connecting member to be inputted to the first voltage modulator, and
   the reference voltage is changed to a second reference voltage by a voltage drop due to the second connecting member to be inputted to the second voltage modulator.

4. The display device of claim 3, wherein
   output voltages of the first voltage modulator and the second voltage modulator become equal to the second power supply voltage based on either one of the first reference voltage and the second reference voltage having a larger voltage drop.

5. The display device of claim 3, wherein
   the first voltage modulator includes:
   an input terminal configured to receive the first reference voltage;
   a plurality of resistors connected in series between the input terminal and a ground;
   a plurality of transistors connected to a plurality of nodes between the input terminal and the ground; and
   an output terminal connected to the plurality of transistors, and
   the plurality of transistors are configured to be selectively turned on by the switch control signal to transmit the second power supply voltage to the output terminal.

6. The display device of claim 3, wherein
   the second voltage modulator includes:
   an input terminal configured to receive the second reference voltage;
   a plurality of resistors connected in series between the input terminal and a ground;
   a plurality of transistors connected to a plurality of nodes between the input terminal and the ground; and
   an output terminal connected to the plurality of transistors, and
   the plurality of transistors are configured to be selectively turned on by the switch control signal to transmit the second power supply voltage to the output terminal.

7. The display device of claim 3, further comprising:
a feedback line configured to feed back the first reference voltage and the second reference voltage to the signal controller.

8. The display device of claim 2, wherein
the first voltage modulator and the second voltage modulator are on the circuit board,
the first voltage modulator is configured to receive the reference voltage to output a first adjustment power supply voltage, and the first adjustment power supply voltage is changed to the second power supply voltage by the voltage drop due to the first connecting member and then supplied to the plurality of pixels, while
the second voltage modulator is configured to receive the reference voltage to output a second adjustment power supply voltage, and the second adjustment power supply voltage is changed to the second power supply voltage by the voltage drop due to the second connecting member and then supplied to the plurality of pixels.

9. The display device of claim 8, wherein
the first voltage modulator includes:
an input terminal configured to receive the reference voltage;
a plurality of resistors connected in series between the input terminal and a ground;
a plurality of transistors connected to a plurality of nodes between the input terminal and the ground; and
an output terminal connected to the plurality of transistors, and
the plurality of transistors are configured to be selectively turned on by the switch control signal to transmit the first adjustment power supply voltage to the output terminal.

10. The display device of claim 8, wherein
the second voltage modulator includes:
an input terminal configured to receive the reference voltage;
a plurality of resistors connected in series between the input terminal and a ground;
a plurality of transistors connected to a plurality of nodes between the input terminal and the ground; and
an output terminal connected to the plurality of transistors, and
the plurality of transistors are configured to be selectively turned on by the switch control signal to transmit the second adjustment power supply voltage to the output terminal.

11. The display device of claim 2, wherein
the circuit board includes a memory configured to store information of the voltage drop due to the first connecting member and the voltage drop due to the second connecting member, and
the signal controller is configured to generate the switch control signal by using the information stored in the memory.

12. The display device of claim 1, wherein
the reference voltage is a negative voltage.

13. A display device comprising:
a display panel comprising a display area including a plurality of pixels;
a power supply electrode overlapping all of the display area;
a circuit board comprising a power supply and a signal controller;
a plurality of connecting members electrically connecting the display panel and the circuit board; and
a plurality of power supply lines configured to connect the power supply and the power supply electrode through the plurality of connecting members,
wherein the power supply is configured to output adjustment power supply voltages of different levels to the plurality of power supply lines according to an output control signal of the signal controller,
wherein
the adjustment power supply voltages of the different levels are changed to second power supply voltages of a low level by voltage drops due to the plurality of connecting members, and then are transmitted to the power supply electrode.

14. The display device of claim 13 wherein
the circuit board includes a memory configured to store information of the voltage drop due to the plurality of connecting members, and
the signal controller is configured to generate the output control signal based on the information stored in the memory.

15. The display device of claim 13, further comprising:
a plurality of feedback lines configured to feed back the second power supply voltage to the signal controller through the plurality of connecting members.

16. The display device of claim 13, wherein
the adjustment power supply voltages of the different levels are negative voltages.

17. A display device comprising:
a display panel comprising a plurality of pixels;
a power supply configured to supply a first power supply voltage to the plurality of pixels and to output a reference voltage;
a connecting member configured to electrically connect the display panel with the power supply; and
a voltage modulator configured to generate a second power supply voltage based on a voltage drop of the connecting member and to supply the second power supply voltage to the plurality of pixels,
wherein each of the plurality of pixels includes:
a light-emitting diode, and
a pixel circuit configured to control a current flowing from the first power supply voltage to the light-emitting diode, and
a cathode of the light-emitting diode is connected to the second power supply voltage.

18. The display device of claim 17, wherein
the voltage modulator includes:
an input terminal configured to receive the reference voltage;
a plurality of resistors connected in series between the input terminal and a ground;
a plurality of transistors connected to a plurality of nodes between the input terminal and the ground; and
an output terminal connected to the plurality of transistors, and
the plurality of transistors are configured to be selectively turned on to transmit the second power supply voltage to the output terminal.

19. The display device of claim 18, further comprising:
a display panel comprising the plurality of pixels;
a circuit board comprising the power supply;
a connecting member configured to electrically connect the display panel and the circuit board;
a memory configured to store information of a voltage drop due to the connecting member; and a signal controller configured to generate a switch control signal that selectively turns on the plurality of transistors based on the information stored in the memory.

* * * * *